United States Patent
New et al.

[11] Patent Number: 5,772,102
[45] Date of Patent: Jun. 30, 1998

[54] GAS LENS ASSEMBLY

[75] Inventors: Kent Miles New, Wichita, Kans.;
William Owen Mofield, O'Fallon, Mo.;
Dale Robert Bervig, Wichita, Kans.

[73] Assignee: Tweco Products, Inc., Wichita, Kans.

[21] Appl. No.: 788,773

[22] Filed: Jan. 24, 1997

Related U.S. Application Data

[63] Continuation-in-part of Ser. No. 634,796, Apr. 19, 1996, abandoned.

[51] Int. Cl.$^6$ ....................................................... B23K 9/16
[52] U.S. Cl. .......................... 228/42; 219/75; 219/137.42
[58] Field of Search ........................ 228/42, 219; 219/74, 219/75, 136, 137.42

[56] References Cited

U.S. PATENT DOCUMENTS

| | | | |
|---|---|---|---|
| 3,053,968 | 9/1962 | Gorman et al. | 219/74 |
| 3,180,967 | 4/1965 | Hill | 219/75 |
| 3,214,623 | 10/1965 | Sheer | 313/231 |
| 3,436,516 | 4/1969 | Swift | 219/121 |
| 3,609,282 | 9/1971 | Trattner et al. | 219/75 |
| 4,275,284 | 6/1981 | Conley | 219/74 |
| 4,300,034 | 11/1981 | Schneider et al. | 219/75 |
| 4,532,406 | 7/1985 | Povlick et al. | 219/124.3 |
| 4,769,521 | 9/1988 | Sugiyama | 219/75 |
| 4,812,611 | 3/1989 | Carleton | 217/74 |
| 5,003,150 | 3/1991 | Stricklen | 219/75 |
| 5,484,973 | 1/1996 | Gittens et al. | 219/74 |
| 5,556,550 | 9/1996 | Fyffe | 219/75 |

OTHER PUBLICATIONS

Capstan Brochure, undated.

*Primary Examiner*—Samuel M. Heinrich
*Attorney, Agent, or Firm*—Senniger, Powers, Leavitt & Roedel

[57] ABSTRACT

A gas lens assembly for an arc welding torch includes a lens body having a rearward end and a forward end, a passage through the lens body from its forward end to its rearward end for receiving an electrode therethrough and for permitting flow of an inert gas in a forward direction in the passage. A lens housing is secured to the lens body and defines a chamber around a forward end portion of the lens body. One or more openings in the forward end portion of the lens body enable the inert gas to flow from the passage into the chamber. The gas lens assembly further includes a flow control device associated with the housing through which said inert gas is adapted to flow in a forward direction. The flow control device controls the flow of the inert gas therethrough so that the gas exists the flow control device as a laminar stream of gas moving in a forward direction. The laminar stream is adapted to blanket a weld puddle during a welding operation on a workpiece. The gas lens assembly further includes a holder for the flow control device releasably and removably attached to the lens housing whereby the flow control member may readily be replaced.

21 Claims, 6 Drawing Sheets

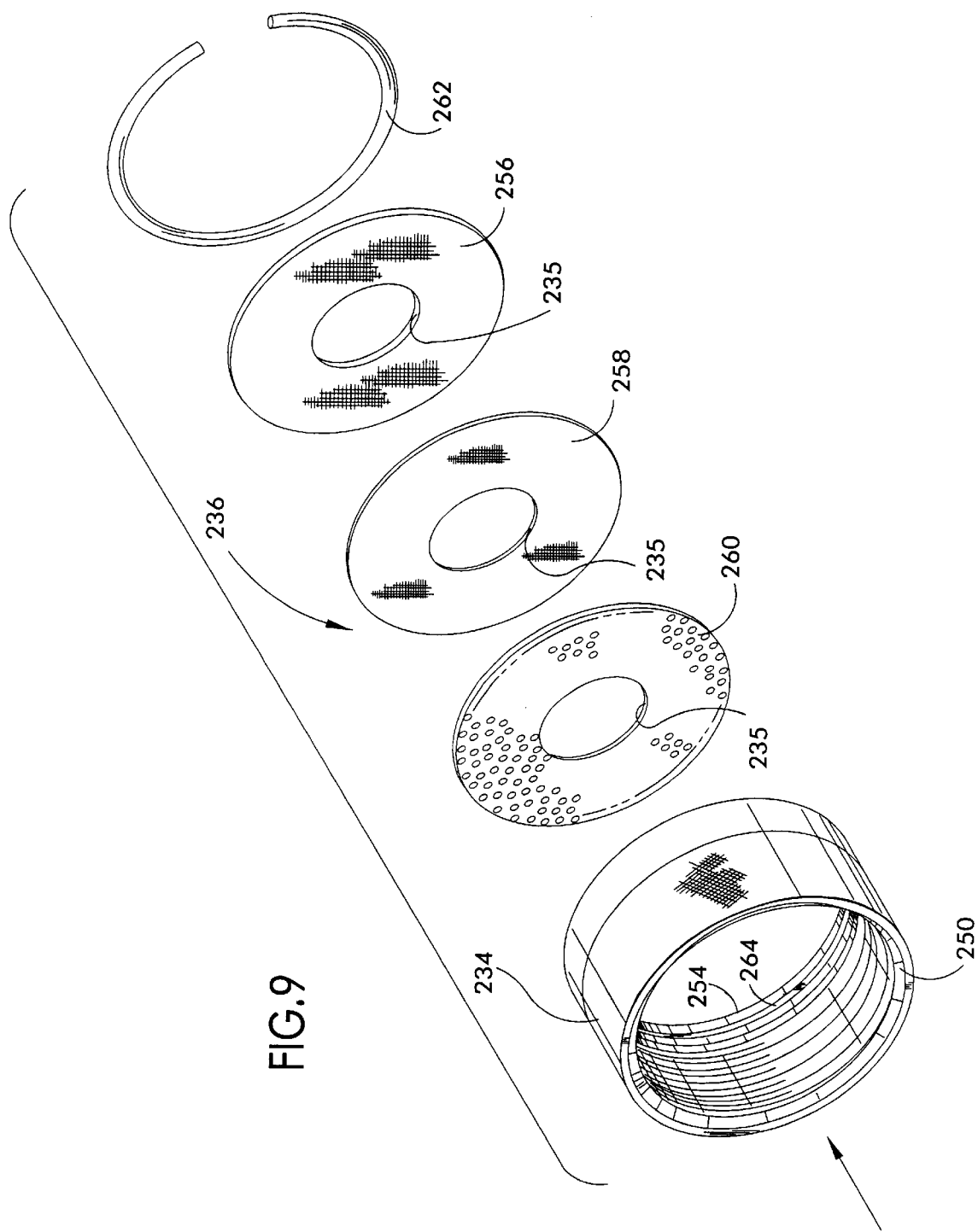

GAS LENS ASSEMBLY

CROSS-REFERENCE TO RELATED APPLICATION

This application is a continuation-in-part of application Ser. No. 08/634,796, filed Apr. 19, 1996, now abandoned.

BACKGROUND OF THE INVENTION

This invention relates generally to arc welding systems, and more particularly to an improved lens assembly for an arc welding torch (e.g., a TIG welding torch).

In an arc welding torch inert gas (e.g., argon) is forced through a gas lens assembly at the front end of the torch to provide a surrounding layer or blanket of inert gas to protect the molten weld puddle. The gas lens assembly is constructed to ensure that the flow of inert gas is laminar. This is important, because if the flow is turbulent, atmospheric air containing oxygen and oxides can come into contact with the weld puddle and cause serious weld quality problems.

FIGS. 1 and 2 illustrate a gas lens assembly of conventional design. As shown, the assembly comprises a tubular lens body 1, a lens housing 3 secured adjacent the forward end of the lens body, and a flow control device comprising a series of wire mesh screens 5 separated by spacers 7 for providing the desired laminar flow characteristics. The screens are held in place in the housing by a locking ring 9. The arrangement is such that inert gas flows through the lens body (which also contains a tungsten electrode), into the housing 3 via outlet ports 11 in the body, and then through the spaced screens 5 which produce the necessary laminar flow. During a welding operation, metal frequently spatters and collects on the front screen so that the lens assembly must be replaced from time to time to insure good weld quality. Replacement of the entire assembly, including the body, the housing and the flow control device is costly.

SUMMARY OF THE INVENTION

Among the several objects of this invention may be noted the provision of an improved gas lens assembly in which the flow control device may be replaced without replacing the entire gas lens, thereby reducing the cost involved in such replacement; the provision of such a gas lens assembly which utilizes a flow control device which produces a laminar flow condition which is as good as or better than a gas lens of conventional design; and the provision of such a gas lens assembly in which replacement of the flow control device can be effected quickly and easily.

In general, a gas lens assembly of the present invention for an arc welding torch comprises a lens body having a rearward end and a forward end, a passage through the lens body from its forward end to its rearward end for receiving an electrode therethrough and for permitting flow of an inert gas in a forward direction in the passage. The gas lens assembly further comprises a lens housing secured to the lens body. The lens housing defines a chamber around a forward end portion of the lens body. The lens body includes one or more openings in the forward end portion of the lens body enabling the inert gas to flow from the passage into the chamber. The gas lens assembly further comprises a flow control device associated with the housing through which the inert gas is adapted to flow in a forward direction. The flow control device controls the flow of the inert gas therethrough so that the gas exits the flow control device as a laminar stream of gas moving in a forward direction. The laminar stream is adapted to blanket a weld puddle during a welding operation on a workpiece. The gas lens assembly further includes a holder for the flow control device releasably and removably attached to the lens housing whereby the flow control member may readily be replaced.

In a second aspect of this invention, the gas lens assembly comprises a lens body having a rearward end and a forward end, a passage through the lens body from its forward end to its rearward end for receiving an electrode therethrough and for permitting flow of an inert gas in a forward direction in the passage. A lens housing is secured to the lens body and defines a chamber around a forward end portion of the lens body. The lens body includes one or more openings in the forward end portion of the lens body enabling the inert gas to flow from the passage into the chamber. The flow control device comprises a single unitary disc of porous metal having a thickness and porosity for controlling the flow of inert gas therethrough so that the gas exits the disc as a laminar stream of gas moving in a forward direction. The laminar stream is adapted to blanket a weld puddle during a welding operation on a workpiece. The disc is readily removable from the gas lens assembly for replacement.

In a third aspect of this invention, the gas lens assembly comprises a lens body having a rearward end and a forward end, and a passage through the lens body from its forward end to its rearward end for receiving an electrode therethrough and for permitting flow of an inert gas in a forward direction in the passage. A lens housing is secured to the lens body and defines a chamber around a forward end portion of the lens body. The lens body includes one or more openings in the forward end portion of the lens body enabling the inert gas to flow from the passage into the chamber. A flow control device is located in or adjacent the chamber through which the inert gas is adapted to flow in a forward direction. The flow control device comprises a plurality of discs of porous metal having a combined thickness and porosity for controlling the flow of inert gas therethrough so that the gas exits the plurality of discs as a laminar stream of gas moving in a forward direction. The laminar stream is adapted to blanket a weld puddle during a welding operation on a workpiece. The plurality of discs are readily removable from the gas lens assembly for replacement.

Other objects and features will be in part apparent and in part pointed out hereinafter.

BRIEF DESCRIPTION OF THE DRAWINGS

FIG. 9 is an exploded view of a flow control device of the gas lens assembly of FIG. 8.

DETAILED DESCRIPTION OF THE PREFERRED EMBODIMENT

Figure 1:
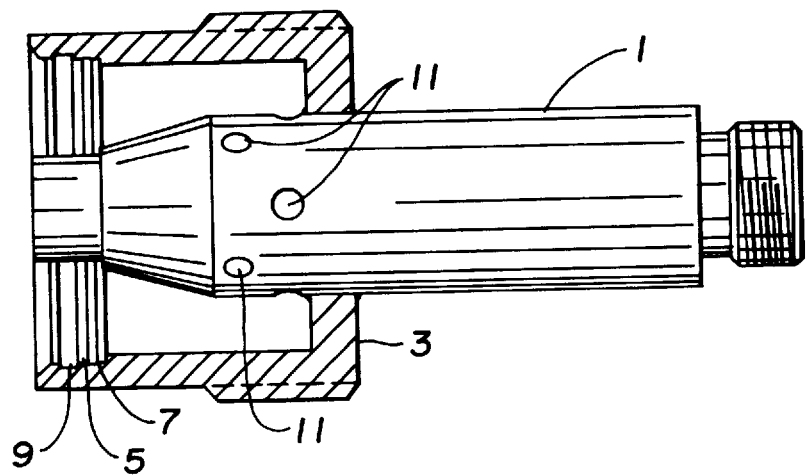
FIG. 1 is side view of a prior art gas lens assembly, part of the assembly being shown in section.

Corresponding parts are designated by corresponding reference numerals and characters throughout the drawings.

Figure 3:
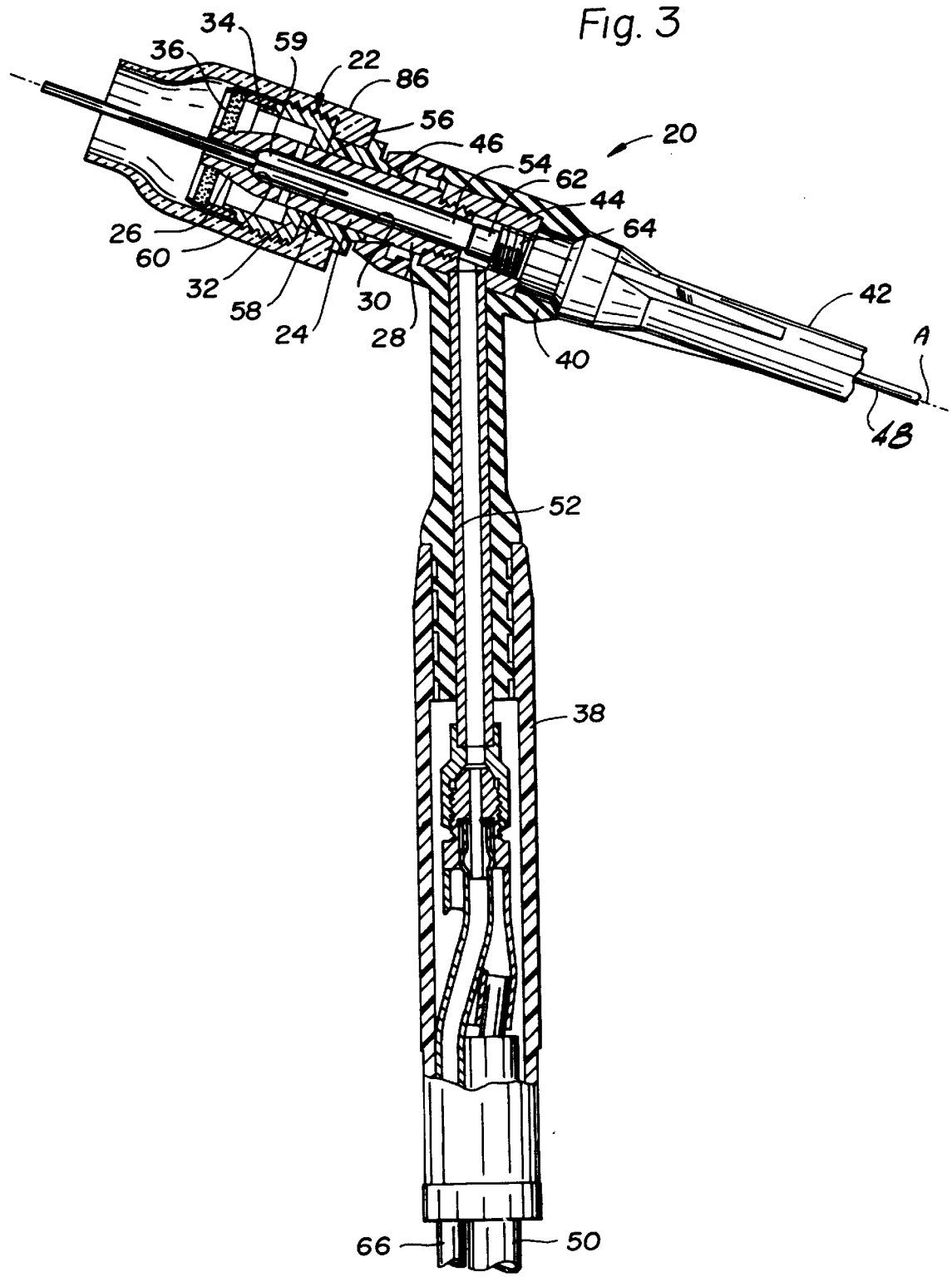
FIG. 3 is a cross-sectional view of an arc welding torch incorporating a gas lens assembly of the present invention.
Figure 6:
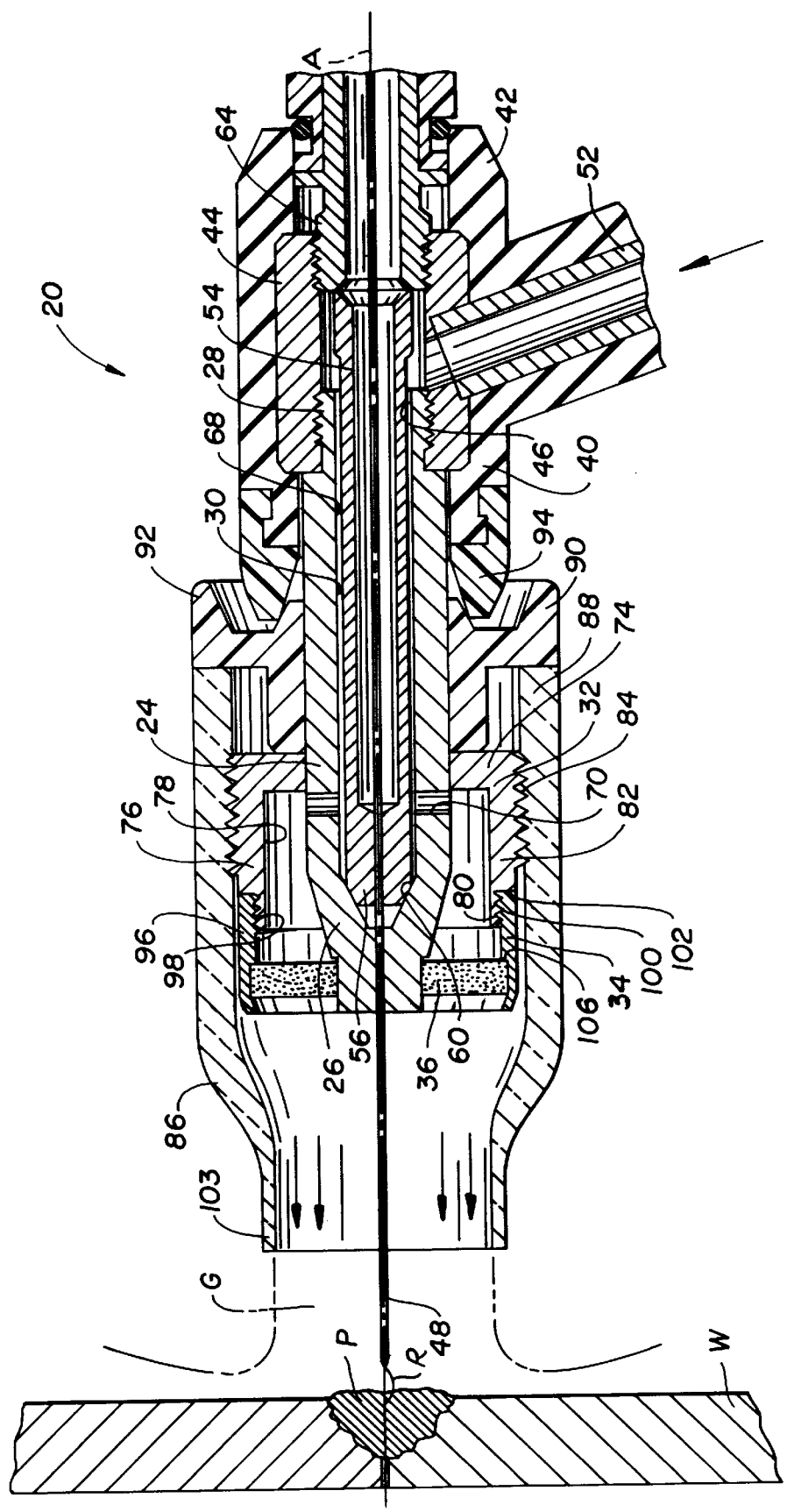
FIG. 6 is an enlarged portion of FIG. 3 illustrating a welding operation.

Referring now to the drawings, and first more particularly to FIGS. 3 and 6, an arc welding torch is indicated in its entirety by the reference numeral 20. The torch is of conventional design, except that it includes an improved gas lens assembly of the present invention, generally designated 22. The lens assembly comprises a cylindric lens body 24 having a tapered forward end 26, a rearward end 28, and a passage 30 through the body from its rearward end to its forward end. The lens assembly also includes a forwardly opening, cup-shaped lens housing 32 adjacent the forward end of the lens body, a holder 34 releasably attached to the housing, and a gas flow control device or element 36 held by the holder at the forward end of the lens housing. The construction of the lens assembly 22 will be described in more detail later in this specification.

As shown in FIG. 3, the welding torch 20 comprises a handle 38 having a tubular head 40 at one end, and an elongate hollow cap 42 extending rearwardly from the head. The rearward end 28 of the lens body 24 is formed for releasable (e.g., threadable) attachment to a cylindric fitting 44 mounted in a fixed position in the head 40. The forward end 26 of the lens body 24 projects forwardly from the fitting 44 through an opening 46 in the forward end of the head 40. The lens body 24, fitting 44, tubular head 40 and cap 42 are all coaxially disposed with respect to the central longitudinal axis A of the head.

An electrode 48 used in the welding process extends coaxially within the cap 42, head 40 and lens body 24, and projects forwardly beyond the head, as illustrated in FIG. 6, so that it may be positioned immediately adjacent a workpiece W to perform an arc welding operation, as will be understood by those skilled in the art. Electrical current is delivered to the electrode by means of a power cable 50 connected to a tubular metal conductor 52 in the handle 38 of the torch. The conductor 52 conducts current to the gas lens assembly 22 and ultimately to the electrode 48 via the fitting 44. The electrode 48 is gripped and held in position by means of a cylindric metal collet 54 coaxially received in the lens body 24. The forward end 56 of the collet 54 has one or more longitudinal slits 58 therein forming resilient gripping elements 59 for releasably gripping the electrode 48 (FIG. 3). The front end 56 of the collet 54 is engageable with a tapered inside wall 60 of the passage 30 through the lens body 24 generally adjacent its forward end 26, and the rear end 62 of the collet is engageable with a tubular member 64 secured to the cap 42, the arrangement being such that when the lens body 24 is threaded into the fitting 44 in the head 40, the engagement of the front end 56 of the collet 54 with the tapered wall 60 of the lens body 24 forces the gripping elements 59 generally radially inwardly to grip the electrode 48 and hold it in a desired position of axial adjustment. The passage 30 through the lens body 24 forward of the tapered wall 60 is sized to have a diameter only slightly greater than the diameter of the electrode 48.

Inert gas (e.g., argon or argon helium) is delivered to the torch 20 by means of hose 66 connected to the tubular conductor 52 in the handle 38. Gas flows from the hose 66 through the conductor 52 and fitting 44 and into the rearward end 28 of the gas lens body 24 where it flows in a forward direction through the passage 30 in an annular space or gap 68 between the collet 54 and the lens body 24. The gas exits the lens body 24 through one or more openings 70 generally adjacent the forward end 26 of the lens body 24 upstream from the tapered wall 60. The engagement of the collet 54 with the tapered wall 60 seals against passage of the gas therepast.

Figure 4:
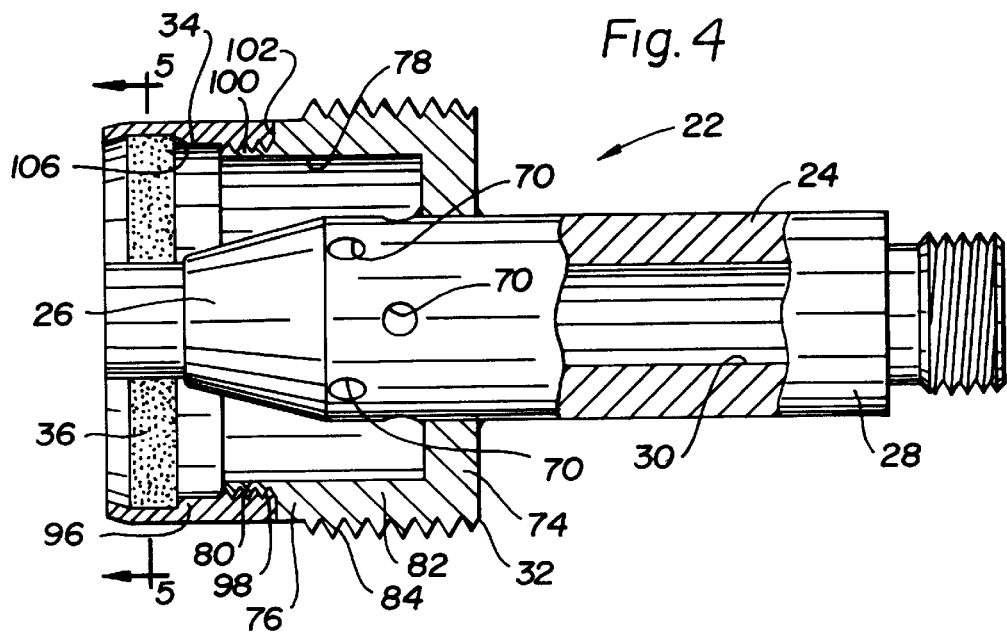
FIG. 4 is an enlarged side view of a gas lens assembly of the arc welding torch of FIG. 3, parts being broken away to show details.
Figure 5:
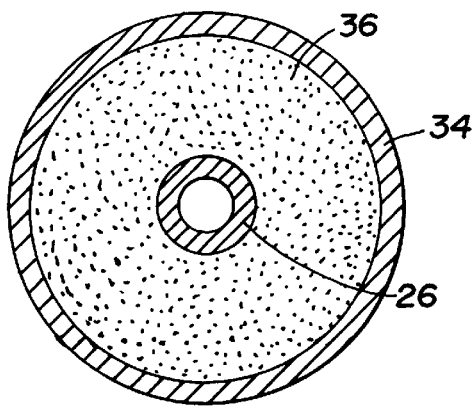
FIG. 5 is a cross-sectional view taken on lines 5—5 of FIG. 4.

The lens body 24 is constructed of suitable metal, such as brass. The gas exit openings 70 are preferably radial openings, although it will be understood that they may also extend at an angle relative to the centerline of the lens body 24. As best illustrated in FIG. 4, the lens housing 32 comprises a cup-shaped member having an annular rear wall 74 lying in a plane extending radially relative to the lens body, and a cylindric side wall 76 extending forwardly from the rear wall and defining a chamber 78 for directing the flow of gas exiting the lens body 24 in a forward direction toward the open forward end (the outlet) of the housing 32. The rear wall 74 of the housing 32 is suitably secured in sealing relation to the lens body 24, as by soldering or the like. The side wall 76 has forward and rearward portions, indicated at 80 and 82, respectively. The rearward portion 82 is somewhat larger in diameter than the forward portion 80 and is formed with external threads 84 for releasable attachment of a ceramic shield 86 to the housing, as illustrated in FIG. 6. The shield 86 projects forwardly beyond the lens housing 32 to maintain a laminar gas flow, as will be discussed in more detail later in this specification. The back end 88 of the shield 86 projects to the rear of the housing 32 for engagement with the radial flange 90 of a spacer 92 disposed between the rear wall 74 of the housing 32 and a nose piece 94 on the front of the head 40 of the welding torch 20. The spacer 92 and the nose piece 94 have a sliding wedge fit to allow the gas lens assembly to be properly tightened relative to the head 40 of the torch 20.

As noted previously, the lens assembly 22 includes a flow control device 36 and a holder 34 for the device which is releasably attachable to the lens housing 32. Specifically, the holder 34 comprises a metal ring 96 having internal threads 98 engageable with external threads 100 on the front portion 80 of the housing 32, the arrangement being such that when the ring 96 is fully tightened it butts up against an external shoulder 102 on the side wall 76 of the housing 32.

In one embodiment of the invention (FIGS. 4–7), the flow control device or element 36 comprises a porous metal disc held by the holder 34 in a fixed position adjacent the forward end of the lens body 24 and in a plane generally at right angles to the central longitudinal axis of the lens body. As thus located, gas exiting the lens housing 32 passes through the disc 36. The disc 36 is held in a fixed position by its engagement with an internal annular shoulder 106 formed on the ring 96, and by the fact that the forward rim of the ring is inwardly swaged, crimped or otherwise deformed to hold the disc captive against the shoulder. Other types of retaining devices may also be used, such as locking rings or tabs, to hold the porous metal disc in place in the ring. The disc 36 has a central opening 35 therethrough for receiving the tapered forward end 26 of the lens body 24.

Figure 2:
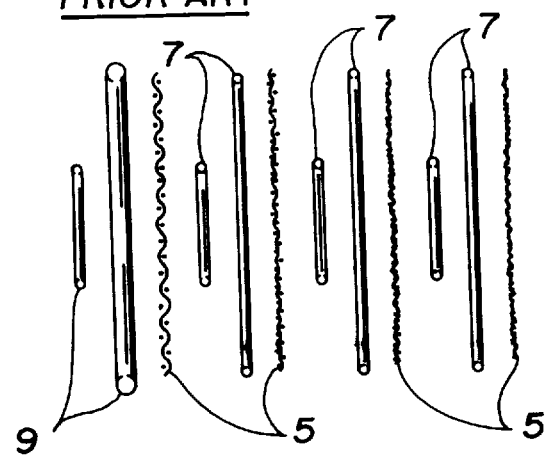
FIG. 2 is an exploded view of a locking ring and a series of screens separated by spacers, of the gas lens assembly of FIG. 1.

Alternatively, the flow control device of the gas lens assembly 22 may comprise a series of wire screens as shown in FIG. 9 and further described below, or a series of wire mesh screens separated by spacers, similar to those shown in FIG. 2, for providing the desired laminar flow characteristics. The screens can be releasably held in place by a holder similar to the one shown in FIG. 4. It will be understood that other filtration type devices may also be used to impart the desired laminar flow characteristics to gas passing through the disc.

The flow control device 36 shown, for example, in FIG. 4, is constructed so that inert gas G exits the device as a laminar stream of gas moving in a forward direction, i.e., the gas particles in the stream move forwardly at a substantially uniform velocity. The flow of gas in chamber 78 is turbulent and generally non-laminar prior to entering the disc 36. As the gas particles pass through the disc 36 they are aligned and evenly distributed so that the particles exit the disc at a substantially uniform velocity and generally flow in the same direction. Shield 86 prevents air flow external to the welding torch from interfering with the gas flow and interrupting the laminar flow. The stream of inert gas is used to blanket the weld puddle P during a welding operation to prevent the introduction of oxygen and other gaseous contaminants into the weld puddle and surrounding area. This is best illustrated in FIG. 6, which shows a typical welding operation in which the welding torch 20 is held so that the tip of the electrode 48 is close to the workpiece W (e.g., two metal plates to be joined) and an arc R is formed to heat the workpiece and a stick welding rod (not shown) to form the molten weld puddle P. Inert gas G exits the disc 36 as a laminar column or stream of gas which forms a blanket over the weld puddle P and surrounding area. The ceramic shield 86 helps maintain the laminar flow by shielding the stream from outside disturbances. The inside diameter of the shield 86 at its forward end 103 is approximately equal to the diameter of the disc 36 so that the flow of the stream is not disturbed.

In one embodiment of the present invention, the disc 36 is formed as a unitary body of sintered metal (e.g., bronze, stainless steel) having a thickness of about 0.125 in., a flow surface area of about 0.45 in$^2$, a porosity sufficient to create a static pressure in chamber 78 of the lens housing 32 of about 1.4 psi at an air flow rate of about 30 cubic feet per hour, a maximum pore size of about 150–330 microns, a particle removal size in the range of about 50–110 microns, and a bubble point of about 1.1–1.7 in. of $H_2O$. More generally, the flow characteristics of this disc provide a static pressure in chamber 78 of between 1.0 and 3.0 psi at an air flow rate of between 20 and 40 cfh. The static pressure in chamber 78 of the lens housing and the flow rate are generally the same as the internal static pressure and flow rate for the prior art flow devices shown in FIGS. 1 and 2. The diameter of the disc may vary to fit within different diameter gas lens assemblies. As the diameter of the disc changes other characteristics such as static pressure, thickness and porosity may also be changed so that the gas flow is metered to provide laminar flow at a desired flow rate. It will be understood that all of the above characteristics may vary without departing from the scope of this invention so long as the desired result (e.g., laminar flow) is obtained. Generally speaking, the thickness of the disc 36 will decrease as the porosity of the metal decreases, and disc thickness will increase as porosity increases.

One flow control element having characteristics suitable to provide the required laminar flow is a porous metal filtration device sold by Capstan Industries of Gardena Calif. under the trade designation F30 or F40.

Figure 7:
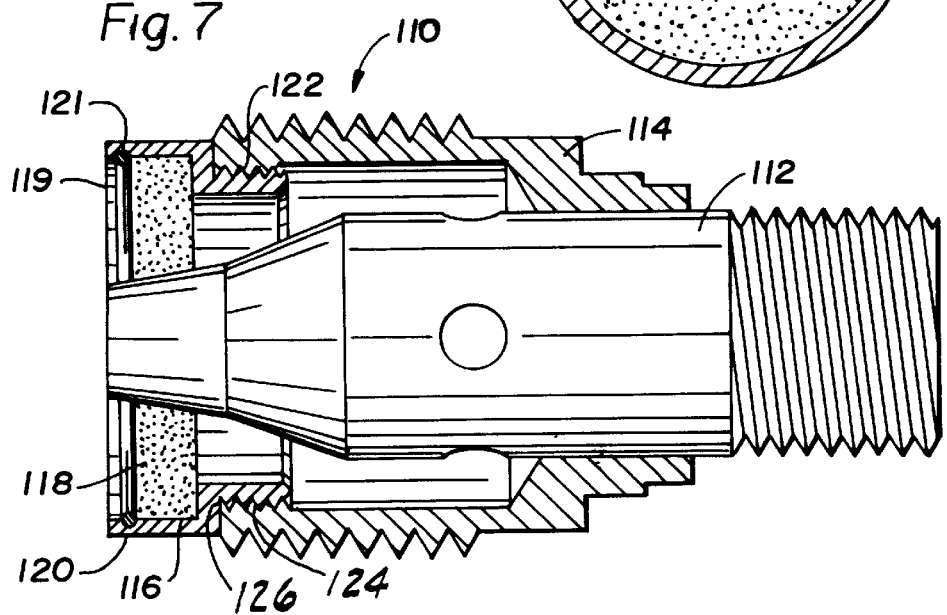
FIG. 7 is an enlarged side view of a second embodiment of the gas lens assembly of FIG. 4.

A second embodiment of the gas lens assembly is shown in FIG. 7. This gas lens assembly, generally designated 110, includes a lens body 112, a housing 114, a holder 116 releasably attached to the housing and a flow control device 118. The flow control device 118 is similar to the flow control device 36 discussed above and is held in place in the holder 116 by a locking ring 119 which fits into a groove 121 formed in the inside wall of the holder adjacent its forward end. The holder 116 comprises a metal ring 120 having external threads 122 engageable with internal threads 124 on the front portion of the housing 114, the arrangement being such that when the ring 120 is fully tightened it butts up against an external shoulder 126 on the housing 114. It is to be understood that other arrangements for releasably attaching the housing and holder may be used without departing from the scope of the invention.

Figure 8:
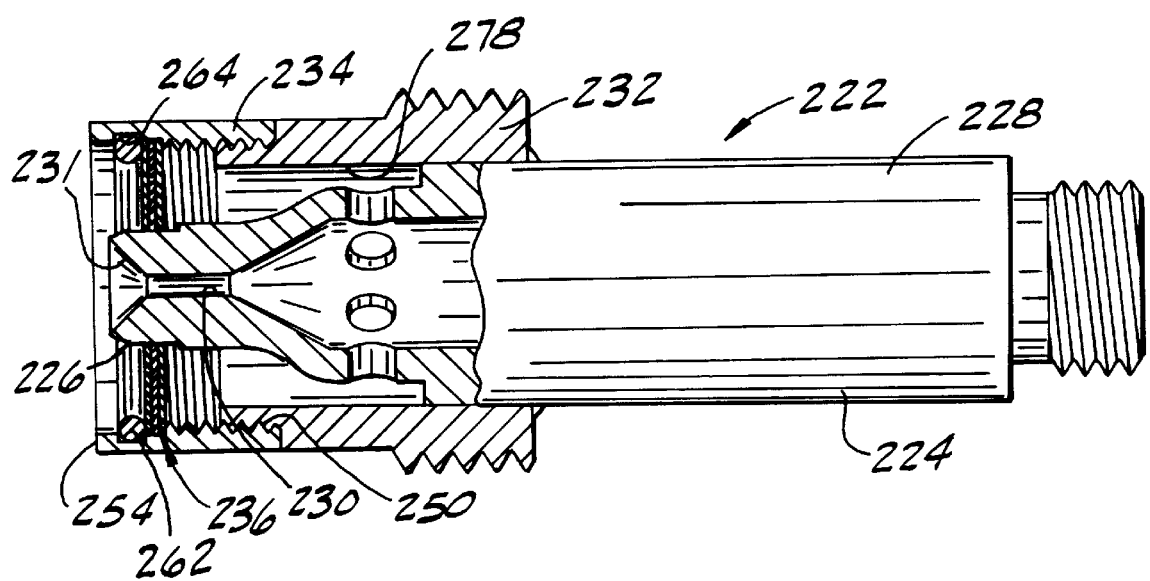
FIG. 8 is an enlarged side view of a third embodiment of the gas lens assembly of the present invention.

A third embodiment of a gas lens assembly is indicated at 222 in FIG. 8. This lens assembly 222 comprises a cylindric lens body 224 having a tapered forward end 226, a rearward end 228, and a passage 230 through the body from its rearward end to its forward end. The lens assembly also includes a forwardly opening, cup-shaped lens housing 232 adjacent the forward end of the lens body, a holder 234 releasably attached to the housing, and a gas flow control device, generally designated 236, held by the holder at the forward end of the lens housing. The lens body 224 and housing 232 are similar to the configurations shown in FIG. 4 and described above and may also be configured as shown in FIG. 7. The forward end 226 of the gas lens body 224 includes a conical depression 231 which provides for ease of insertion of the electrode 48 into the body.

The holder 234 and gas flow control device 236 are shown in more detail in FIG. 9. As illustrated in this exploded view, the holder has a gas entry end 250 and a gas exit end 254. The flow control device 236 comprises three relatively thin parallel discs 256, 258, 260 of porous material mounted in the holder generally at right angles to the direction of gas flow. The first (front) disc 256 is located adjacent to the exit end of the holder; the third (rear) disc 260 is located adjacent the entry end of the holder; and the second (middle) disc 258 is interposed between the first and third discs. The discs 256, 258, 260 are preferably located immediately adjacent and in contact with one another with no spacing between the discs. This arrangement reduces the space required for the flow control device while still providing flow and pressure drop characteristics which result in laminar flow of the gas passing through the discs. Each of the discs 256, 258, 260 has a central opening 235 therethrough for receiving the tapered forward end 226 of the lens body 224. A retaining ring 262 is located immediately forward of the first disc 256 in an internal groove 264 in the holder 234 to retain the discs within the holder.

The first and second discs 256, 258 are preferably stamped screen filters with the second disc being less porous than the first and third discs. The first disc 256 is preferably formed from coarse wire cloth. The cloth may have, for example, a wire diameter of 0.0055 in., a width opening of the holes in the cloth of 0.006 in., and a mesh per square inch of 90×90. The second disc 258 is preferably formed from fine wire cloth having, for example, a wire diameter of 0.0014 in., a width opening of the holes in the cloth of 0.0028 in., and a mesh per square inch of 230×230. The third disc 260 is preferably formed from a perforated stainless steel sheet having, for example, a thickness of approximately 0.008 in., a hole diameter of 0.020 in., a staggered hole orientation and a distance between the hole centers of 0.040 in. The three discs 256, 258, 260 are made from 304 stainless steel or other suitable material. The steel sheet and cloth for the discs 256, 258, 260 are available from McMaster-Carr of Chicago, Ill. under trade designation numbers 85385T871, 85385T879 and 9329T2, respectively. The combined flow characteristics of the three discs 256, 258, 260 may, for example, provide a static pressure in chamber 278 of between 0.003 and 0.113 psi at an air flow rate of between 20 and 40 cubic feet per hour. It is to be understood that the number of discs and arrangement (order), spacing, porosity, thickness and material of the discs may vary without departing from the scope of this invention as long as the series of discs provide the desired result (e.g., laminar flow of the gas passing through the discs). The flow control device 236 can be used with different diameter gas lens bodies and is preferred over the flow control device 36 of the first embodiment for gas lens bodies having a diameter of less than 0.31 inches. This is because a relatively thick disc 36 is required to provide adequate flow characteristics to produce laminar flow, thus increasing the size of the gas lens assembly.

It will be observed from the foregoing that the present invention enables the flow control devices 36, 118, 236 to be replaced quickly and easily, as when the front face of the disc becomes spattered with weld material. This is accomplished simply by unscrewing (or otherwise detaching) the holder 34, 116, 234 holding the flow control device 36, 118, 236 from the housing 32, 114, 232 and replacing the combination with a new holder and flow control device. There is no need to replace the entire lens assembly 22, 110, 222 thereby resulting in a substantial savings in time and cost.

Other embodiments of the present invention are also contemplated. The holder for the flow control device may take many forms and be releasably attached to the lens housing or lens body in many ways. Moreover, the holder may be eliminated altogether if the flow control device is releasably attached directly to the lens housing, as where the disc is threadably engageable with the housing.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A gas lens assembly for an arc welding torch, comprising a lens body having a rearward end and a forward end, a passage through the lens body from its forward end to its rearward end for receiving an electrode therethrough and for permitting flow of an inert gas in a forward direction in said passage, a lens housing secured to the lens body and defining a chamber around a forward end portion of the lens body, one or more openings in the forward end portion of the lens body enabling said inert gas to flow from said passage into said chamber, a flow control device associated with said housing through which said inert gas is adapted to flow in a forward direction, said flow control device controlling the flow of said inert gas therethrough so that the gas exits the flow control device as a laminar stream of gas moving in a forward direction, said laminar stream being adapted to blanket a weld puddle during a welding operation on a workpiece, and a holder for said flow control device releasably and removably attached to said lens housing whereby the flow control member may readily be replaced.

2. A gas lens assembly as set forth in claim 1 wherein said holder comprises a ring threadably attached to said lens housing.

3. A gas lens assembly as set forth in claim 2 wherein said flow control device comprises a thin disc of porous metal mounted in said ring generally at right angles to the direction of gas flow.

4. A gas lens assembly as set forth in claim 3 wherein said disc of porous metal is affixed to said holder.

5. A gas lens assembly as set forth in claim 1 wherein said flow control device comprises a member of porous metal having a porosity sufficient to create a pressure drop of between 1 and 2 psi across the member at an air flow rate of between 20 and 40 cubic feet per hour.

6. A gas lens assembly as set forth in claim 1 wherein said flow control device comprises a member of porous metal having a maximum pore size of between 150 and 330 microns.

7. A gas lens assembly as set forth in claim 1 wherein said flow control device comprises a member of porous metal having a particle removal size in the range of about 50–110 microns and a bubble point of about 1.1–1.7 in. of $H_2O$.

8. A gas lens assembly as set forth in claim 1 wherein said flow control device comprises a plurality of thin parallel discs of porous metal mounted in said holder generally at right angles to the direction of gas flow.

9. A gas lens assembly as set forth in claim 8 wherein said plurality of discs comprises three discs.

10. A gas lens assembly as set forth in claim 9 wherein said three discs comprise a first disc disposed adjacent an exit end of the holder, a third disc disposed adjacent an entry end of the holder and a second disc interposed between the first and third discs, said second disc being less porous than said first and third discs.

11. A gas lens assembly as set forth in claim 9 wherein said three discs are in contact with one another.

12. A gas lens assembly as set forth in claim 8 further comprising a retaining ring for retaining the discs in the holder.

13. A gas lens assembly as set forth in claim 8 wherein the discs of said plurality of discs have a combined porosity sufficient to create a pressure drop of between 0.003 and 0.113 psi across the discs at an air flow rate of between 20 and 40 cubic feet per hour.

14. A gas lens assembly as set forth in claim 8 wherein the discs of said plurality of discs are formed from stainless steel.

15. A gas lens assembly for an arc welding torch, comprising a lens body having a rearward end and a forward end, a passage through the lens body from its forward end to its rearward end for receiving an electrode therethrough and for permitting flow of an inert gas in a forward direction in said passage, a lens housing secured to the lens body and defining a chamber around a forward end portion of the lens body, one or more openings in the forward end portion of the lens body enabling said inert gas to flow from said passage into said chamber, a flow control device in or adjacent said chamber through which said inert gas is adapted to flow in a forward direction, said flow control device comprising a single unitary disc of porous metal having a thickness and porosity for controlling the flow of inert gas therethrough so that the gas exits the disc as a laminar stream of gas moving in a forward direction, said laminar stream being adapted to blanket a weld puddle during a welding operation on a workpiece, and said disc being readily removable from the gas lens assembly for replacement.

16. A gas lens assembly for an arc welding torch comprising a lens body having a rearward end and a forward end, a passage through the lens body from its forward end to its rearward end for receiving an electrode therethrough and for permitting flow of an inert gas in a forward direction in said passage, a lens housing secured to the lens body and defining a chamber around a forward end portion of the lens body, one or more openings in the forward end portion of the lens body enabling said inert gas to flow from said passage into said chamber, a flow control device in or adjacent said chamber through which said inert gas is adapted to flow in a forward direction, said flow control device comprising a plurality of parallel discs of porous metal having a combined thickness and porosity for controlling the flow of inert gas therethrough so that the gas exits the plurality of discs as a laminar stream of gas moving in a forward direction, said laminar stream being adapted to blanket a weld puddle during a welding operation on a workpiece, and said plurality of discs comprising at least one disc formed from metal wire cloth and a perforated disc formed from nonwoven sheet metal, said discs being readily removable from the gas lens assembly for replacement.

17. A gas lens assembly as set forth in claim 16 wherein each disc of said plurality of discs is a thin porous metal disc.

18. A gas lens assembly as set forth in claim 17 wherein said plurality of discs comprises three discs, each disc having a different porosity.

19. A gas lens assembly as set forth in claim 16 wherein said perforated disc and said disc formed from metal wire cloth are substantially identical in size and shape and are in face-to-face contact with one another.

20. A gas lens assembly as set forth in claim 18 wherein said three discs are in contact with one another.

21. A gas lens assembly as set forth in claim 17 wherein said plurality of discs have a combined porosity sufficient to create a pressure drop of between 0.003 and 0.113 psi across the discs at an air flow rate of between 20 and 40 cubic feet per hour.

* * * * *